(12) United States Patent
Berendsen et al.

(10) Patent No.: US 9,619,004 B1
(45) Date of Patent: Apr. 11, 2017

(54) REDUCING SYSTEM POWER CONSUMPTION DUE TO USB HOST CONTROLLERS

(75) Inventors: John Berendsen, Beaconsfield (CA); Robert Chapman, Mountian View, CA (US)

(73) Assignee: NVIDIA Corporation, Santa Clara, CA (US)

( * ) Notice: Subject to any disclaimer, the term of this patent is extended or adjusted under 35 U.S.C. 154(b) by 956 days.

(21) Appl. No.: 11/613,845

(22) Filed: Dec. 20, 2006

(51) Int. Cl.
*G06F 1/32* (2006.01)

(52) U.S. Cl.
CPC .............. *G06F 1/325* (2013.01); *G06F 1/329* (2013.01)

(58) Field of Classification Search
CPC .................................. G06F 1/325; G06F 1/329
USPC ......... 710/107, 5, 6, 100, 313; 713/320, 323
See application file for complete search history.

(56) References Cited

U.S. PATENT DOCUMENTS

| 6,085,325 | A * | 7/2000 | Jackson et al. ............... 713/300 |
| 6,449,663 | B1 * | 9/2002 | Carney et al. ................. 710/15 |
| 6,467,042 | B1 * | 10/2002 | Wright et al. ................. 713/320 |
| 6,640,268 | B1 * | 10/2003 | Kumar ........................... 710/46 |
| 6,816,976 | B2 * | 11/2004 | Wright et al. ................. 713/323 |
| 7,058,747 | B2 * | 6/2006 | Chang et al. .................. 710/305 |
| 7,231,468 | B2 * | 6/2007 | Cline .............................. 710/15 |
| 7,281,074 | B2 * | 10/2007 | Diefenbaugh et al. ........ 710/260 |
| 7,340,550 | B2 * | 3/2008 | Derr et al. ..................... 710/308 |
| 7,480,739 | B1 * | 1/2009 | Berendsen ........................ 710/5 |
| 7,490,255 | B2 * | 2/2009 | Diefenbaugh et al. ........ 713/320 |
| 7,634,587 | B2 * | 12/2009 | Ferguson et al. ................. 710/5 |
| 7,702,825 | B2 * | 4/2010 | Howard .......................... 710/18 |

OTHER PUBLICATIONS

Intel Corporation. Enhanced Host Controller Interface Specification for Universal Serial Bus. Revision 1.0. Mar. 12, 2002.*
Intel Corporation. Universal Host Controller Interface (UHCI) Design Guide. Revision 1.1. Mar. 1996.*

* cited by examiner

*Primary Examiner* — Nimesh G Patel
(74) *Attorney, Agent, or Firm* — Artegis Law Group, LLP

(57) ABSTRACT

Circuits, methods, and apparatus that reduce the power consumed by data transfers initiated by a USB host controller. Peripheral devices on a USB network are accessed with a reduced frequency in order to save power dissipated by a CPU and other circuits when reading data needed by the host controller. Instead of possibly accessing devices each frame, peripheral devices are accessed during some frames, and not accessed during others. A USB host controller may have two or more modes, such as a low power mode and a regular mode. In the low power mode, USB devices are accessed during fewer than all frames, in the regular mode, USB devices are possibly accessed each frame. Mode selection may depend on whether battery power is used.

37 Claims, 14 Drawing Sheets

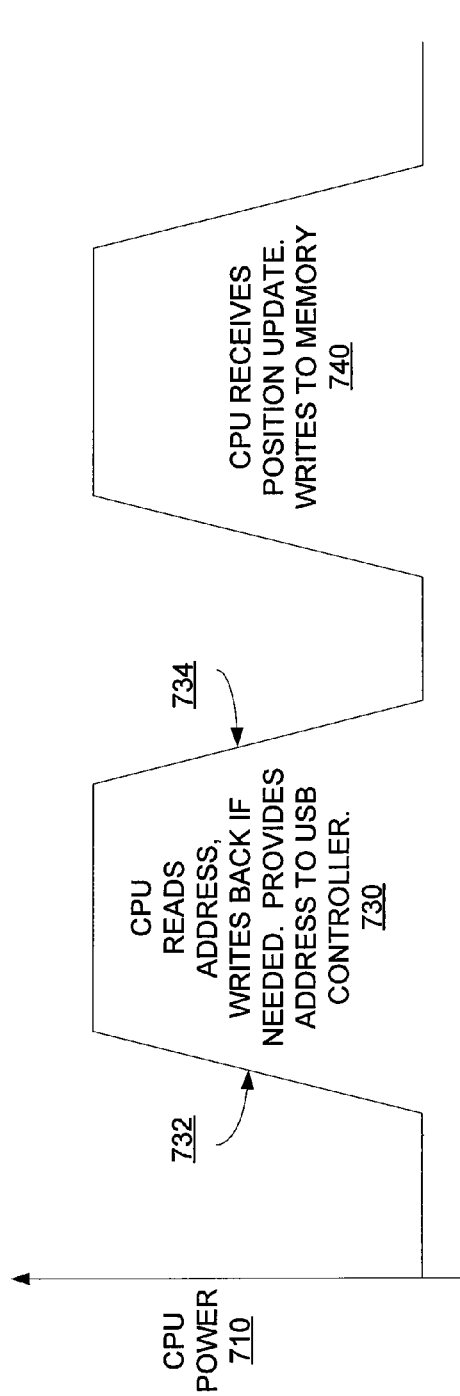
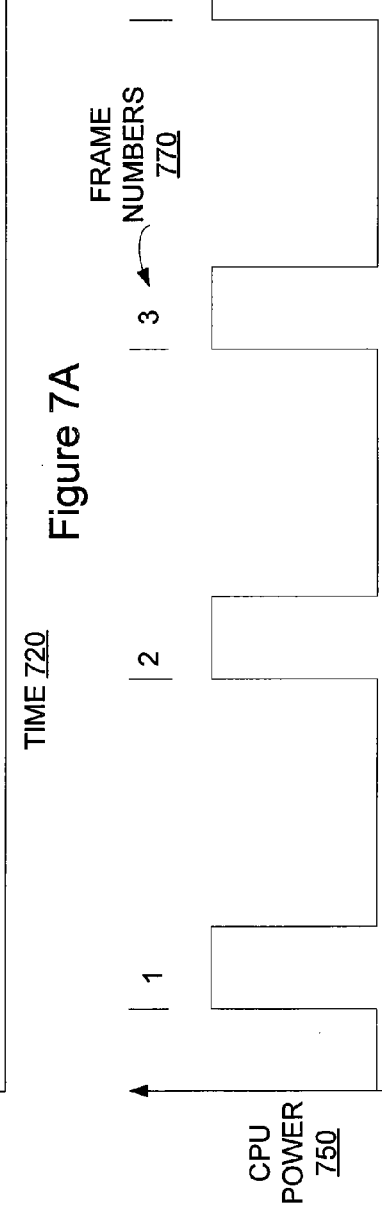
Figure 7A
Figure 7B

REDUCING SYSTEM POWER CONSUMPTION DUE TO USB HOST CONTROLLERS

CROSS-REFERENCES TO RELATED APPLICATIONS

This application is related to co-owned U.S. patent application Ser. No. 11/613,874, now patented as U.S. Pat. No. 8,806,100, titled "Synchronizing Multiple USB Controllers to Reduce Power," by Berendsen et al, which is hereby incorporated by reference.

BACKGROUND

The present invention relates generally to USB networking, and more specifically to reducing the power consumed by transactions initiated by USB host controllers.

Universal Serial Bus (USB) networks have become the most popular paths for data transmission between computers and peripheral devices. Specifically, USB networks are used as personal-area wired networks to transfer data between a desktop, notebook or other computer system and devices such as printers, scanners, cameras, speakers, mice, keyboards, and hard disks. A computer may have one or more USB ports, and these may be extended further using one or more hubs.

Currently, the USB 2 standard has become very popular, replacing the USB 1 standard, with which it is backward compatible. USB 2 supports data transfer rates of 480 Mb/s, the so called "high speed" rate, while USB 1 supports 12 Mb/s, "full speed" and 1.5 Mb/s, "low speed" rates. Typically, peripheral devices such as mice and keyboards operate at a lower speed to reduce component costs, while higher bandwidth devices, such as camcorders, operate at the high speed.

These peripheral devices operate as slave devices on the USB bus. That is, they must be queried by the USB host controller as to whether they have data to provide. For example, a mouse is periodically asked by the USB controller whether it has been moved. In order to ask the mouse whether it has moved, the USB controller reads data, such as a bus address, from a system memory. Each of these memory reads consumes power. For example, one or more devices may need to be woken from a low power or sleep state. Also, reading data from a memory generates voltage transactions across various stray capacitances. These voltage changes require current, which causes power to be dissipated.

This power dissipation is undesirable, particularly in battery powered devices, such as laptop computers. Thus, what is needed are circuits, methods, and apparatus that reduce the power consumed by these memory reads.

SUMMARY

Accordingly, embodiments of the present invention provide circuits, methods, and apparatus that reduce the power consumed by transactions initiated by a USB host controller.

During each frame that a USB host controller accesses a peripheral device, also known as a function or endpoint, the USB host controller requires information for the device. This information is stored in a system memory. The host controller provides a read request to a CPU for this information. Unfortunately, if the system is in a low-power or sleep state, the system must wake from the sleep state to process the read request. In a specific example, the CPU is in a low power state and must enter a higher power mode to examine the request for a match with data held in the CPU data cache. Accordingly, an exemplary embodiment of the present invention accesses these peripheral devices on a less frequent basis. As a result, read requests are made less often, and the system may possibly remain in a sleep state for a longer period of time, thus saving power.

In a specific embodiment of the present invention, instead of possibly being accessed each frame, the peripheral devices are accessed during some frames, and not accessed during others. Typically, peripheral devices are accessed in a defined order according to two schedules, referred to as a periodic schedule and an asynchronous (async) schedule. In conventional controllers, the periodic schedule and at least part of the async schedule are traversed during a frame. In this embodiment of the present invention, the periodic schedule and at least part of the async schedule are traversed during some frames and not traversed during others. Since the peripheral devices are not accessed, the USB host controller does not make memory requests during frames that the schedules are not traversed. This allows the system to remain in a low-power state (if it is in one) thus reducing system power dissipation.

One such embodiment of the present invention employs a counter to track frames. This counter may be a physical counter, such as a counter formed using a number of flip-flops, or it may be a counter implemented in software. Alternately, a CPU may use a timer, such as a general purpose hardware timer, to trigger an interrupt, thereby waking the CPU at the time the schedules should be enabled. During a first number of frames, devices on a USB bus are not accessed, that is, the schedules are not traversed. During a second number of subsequent frames, the schedules are traversed and devices are accessed. In a specific embodiment of the present invention, the devices are not accessed for 31 frames, after which they are accessed for one frame.

Another embodiment of the present invention provides a USB host controller having two or more modes, such as a low power mode and a regular mode. In the low power mode, USB devices are accessed during fewer than all frames; in the regular mode, USB devices are accessed each frame. Mode selection may depend on the power supply used. For example, the low power mode may be selected when battery power is used; the regular mode selected when the device is plugged in.

Various embodiments of the present invention may incorporate these and the other features described herein. A better understanding of the nature and advantages of the present invention may be gained by reference to the following detailed description and the accompanying drawings.

BRIEF DESCRIPTION OF THE DRAWINGS

FIG. 3A is a block diagram of a Southbridge circuit that incorporates an embodiment of the present invention, while

FIGS. 7A and 7B illustrates the increase in CPU power dissipation when various activities initiated by a USB host controller occur;

DESCRIPTION OF EXEMPLARY EMBODIMENTS

Figure 1:
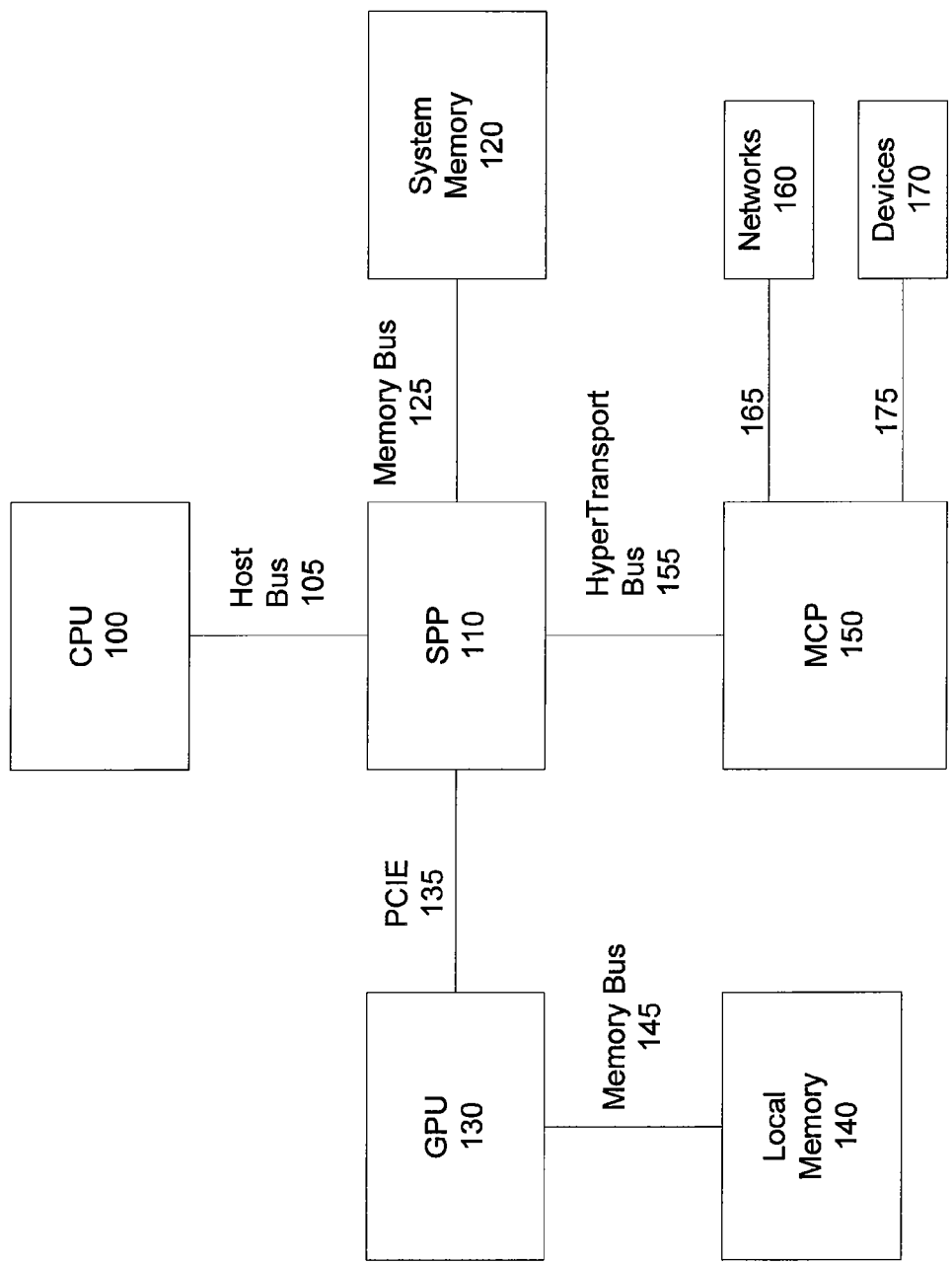
FIG. 1 is a block diagram of a computing system that is improved by incorporating an embodiment of the present invention.

FIG. 1 is a block diagram of a computing system that is improved by incorporating an embodiment of the present invention. This block diagram includes a central processing unit (CPU) or host processor 100, system platform processor (SPP) 110, system memory 120, graphics processing unit (GPU) 130, local memory 140, media communications processor (MCP) 150, networks 160, and internal and peripheral devices 170.

The CPU 100 connects to the SPP 110 over the host bus 105. The SPP 110 is in communication with the graphics processing unit 130 over a PCIE connection 135. The SPP 110 reads and writes data to and from the system memory 120 over the memory bus 125. The MCP 150 communicates with the SPP 110 via a high-speed connection, such as a HyperTransport bus 155, and connects network 160 and internal and peripheral devices 170 to the remainder of the computer system. The graphics processing unit 130 receives data over the PCIE connection 135 and generates graphic and video images for display over a monitor or other display device (not shown). The graphics processing unit 130 stores fragment and other graphics data in the local memory 140.

The CPU 100 may be a processor, such as those manufactured by Intel Corporation or other supplier, and is well-known by those skilled in the art. The SPP 110 and MCP 150 are commonly referred to as a chipset, and each is typically an integrated circuit. These may alternately be Northbridge and Southbridge devices. The system memory 120 is often a number of dynamic random access memory devices arranged in dual in-line memory modules (DIMMs). The graphics processing unit 130, SPP 110, and MCP 150 are preferably manufactured by NVIDIA Corporation.

The graphics processing unit 130 and local memory 140 may be located on a daughter board or graphics card, while the CPU 100, system platform processor 110, system memory 120, and media communications processor 150 may be located on a computer system motherboard. The graphics card is typically a printed-circuit board with the graphics processing unit 130 and local memory 140 attached. The printed-circuit board typically includes a connector, for example, a PCIE connector attached to the printed-circuit board that fits into a PCIE slot included on the motherboard.

While this embodiment provides a specific type computer system that may be improved by the incorporation of an embodiment of the present invention, other types of electronic or computer systems may also be improved. For example, video and other game systems, navigation, set-top boxes, pachinko machines, and other types of electronic systems may be improved by the incorporation of embodiments of the present invention.

Also, while these types of computer systems, and the other electronic systems described herein, are presently commonplace, other types of computer and electronic systems are currently being developed, and others will be developed in the future. It is expected that many of these may also be improved by the incorporation of embodiments of the present invention. Accordingly, the specific examples listed are explanatory in nature and do not limit either the possible embodiments of the present invention or the claims.

Figure 2:
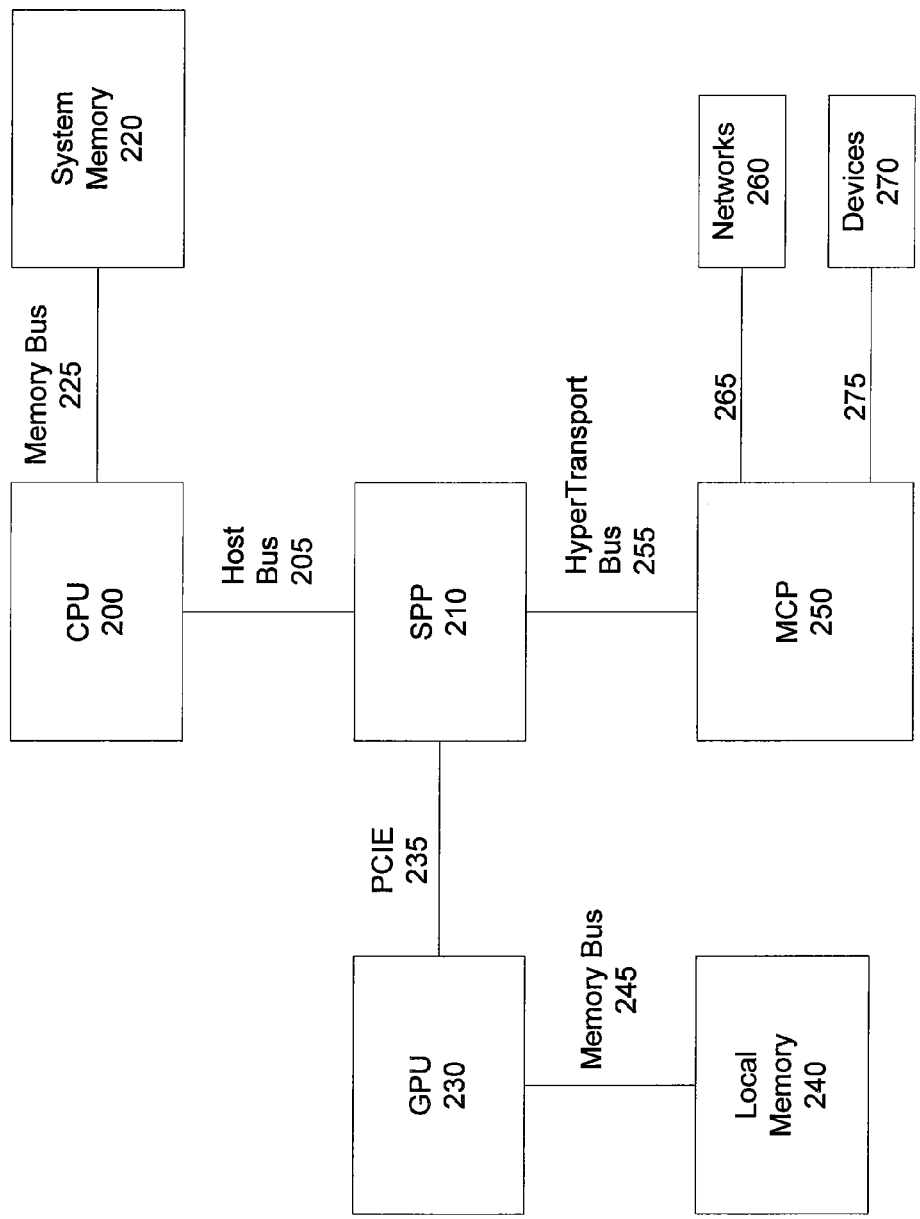
FIG. 2 is a block diagram of another computing system that is improved by incorporating an embodiment of the present invention.

FIG. 2 is a block diagram of another computing system that is improved by incorporating an embodiment of the present invention. This block diagram includes a central processing unit or host processor 200, SPP 210, system memory 220, graphics processing unit 230, MCP 250, networks 260, and internal and peripheral devices 270. A frame buffer, local, or graphics memory 240 is included.

The CPU 200 communicates with the SPP 210 via the host bus 205 and accesses the system memory 220 via the memory bus 225. The GPU 230 communicates with the SPP 210 over the PCIE bus 235 and the local memory 240 over memory bus 245. The MCP 250 communicates with the SPP 210 via a high-speed connection such as a HyperTransport bus 255, and connects network 260 and internal and peripheral devices 270 to the remainder of the computer system.

As before, the central processing unit or host processor 200 may be one of the central processing units manufactured by Intel Corporation or other supplier and are well-known by those skilled in the art. The graphics processor 230, integrated graphics processor 210, and media and communications processor 240 are preferably provided by NVIDIA Corporation.

Figure 3A:
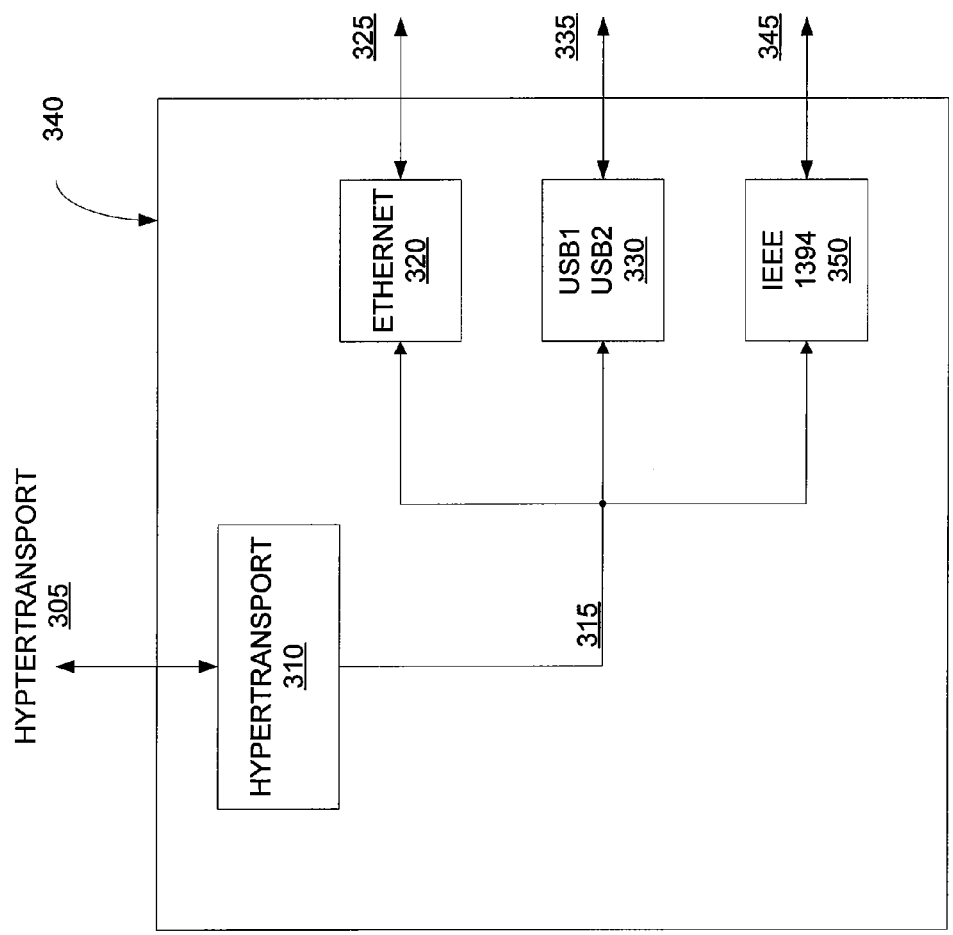

FIG. 3A is a block diagram of a Southbridge circuit that may be used as the Southbridge 140 in FIG. 1, or as a Southbridge in other embodiments of the present invention. Included are a Hypertransport interface 310, Ethernet media access controller (MAC) 320, USB unit 330, and IEEE (1394) media access controller 350.

The Hypertransport interface 310 may be a fast Hypertransport interface communicating with the Northbridge over a Hypertransport channel 305. The Hypertransport interface 310 provides a signal path 315 over which it communicates with the various media access controllers. The Ethernet MAC 320 provides one or more ports 325, the USB unit 330 provides one or more ports 335, and the IEEE (1394) MAC 350 provides one or more ports 355.

The USB unit 330 further includes one or more host controllers. Alternately the Southbridge 340 may include multiple USB units, each including one or more one or more host controllers. The host controllers communicate with one or more devices on a USB bus. The host controller also provides such overhead functions as a start of frame signal, which is sent onto the bus once each frame. The host controllers pass memory read requests to the CPU via the Hypertransport interface 310.

Figure 3B:
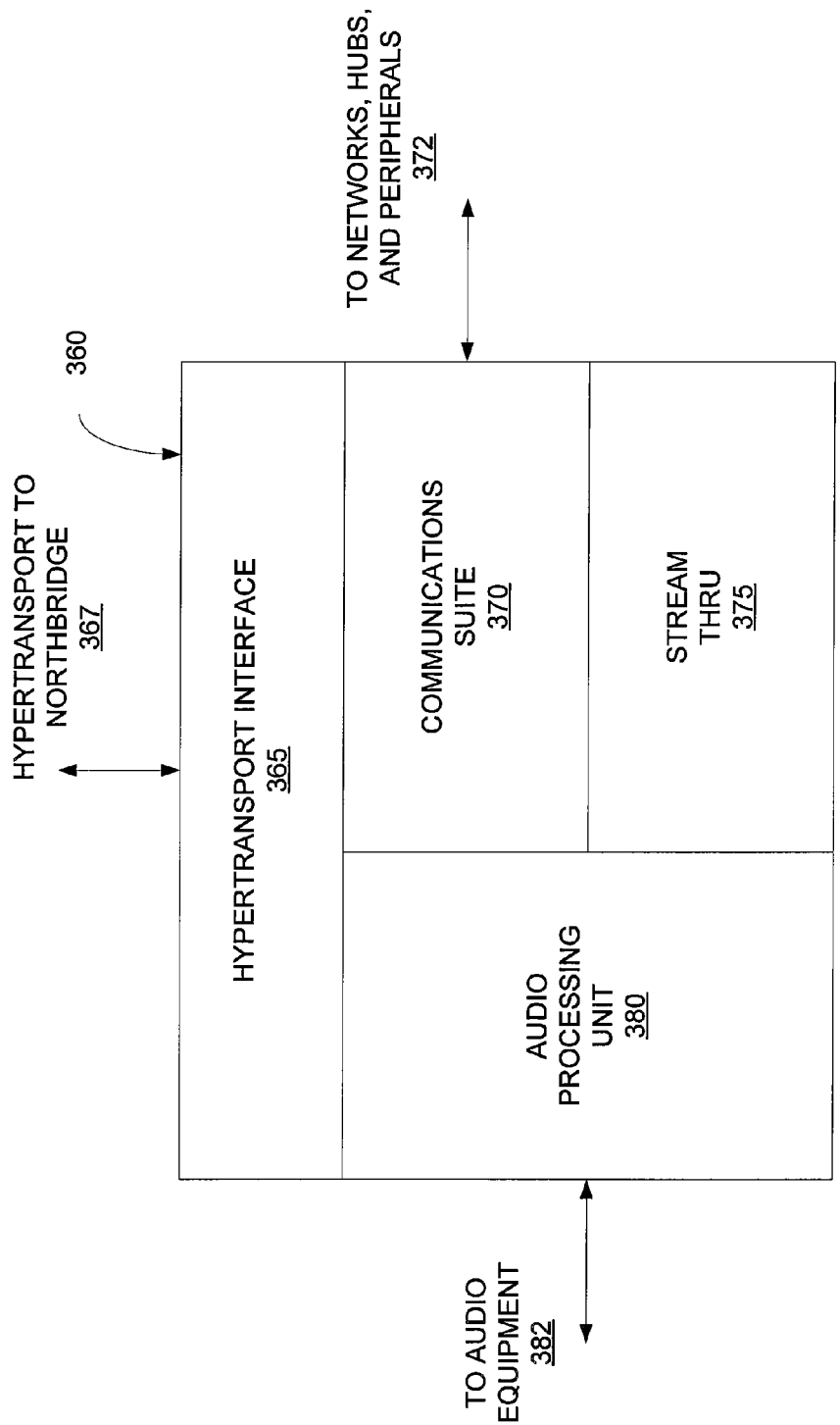
FIG. 3B illustrates an nForce MCP that incorporates an embodiment of the present invention.

FIG. 3B illustrates an nForce MCP that incorporates an embodiment of the present invention. Included on the nForce MCP are a Hypertransport interface circuit 365, communications suite 370, StreamThru™ circuitry 375, and audio processing unit (APU) 380.

The communications suite 370 includes circuitry such as a USB interface and controller, as well as an Ethernet MAC, IEEE 1394, and potentially other networking circuits.

The Southbridge 340 and nForce MCP 360 may each be formed on an integrated circuit, or they may be formed on more than one integrated circuit. Alternately, the Southbridge 340 or nForce MCP 360 may be combined, possibly with still other circuits, on a single integrated circuit.

The USB host controller in the Southbridge 340 or nForce MCP 360 sends and receives data in the form of packets to and from the USB devices or hubs. Data packets to be sent to devices are scheduled, that is, they are placed in linked lists of packets to be transmitted. Packets are sent during time intervals of 1 ms—this time period is referred to as a frame. Each frame is further subdivided into eight microframes, each 125 us in duration.

These data packets are organized into one of two lists or schedules. Data packets on these lists are sent during each microframe. Again, the lists are referred to as the periodic schedule and the async schedule. The periodic schedule is organized as a binary tree that is traversed from the leaf to root, where the leaf level is the same for 8 consecutive microframes, and incremented each frame. The periodic list provides an isochronous data transfer. Applications requiring a guaranteed bandwidth are placed on the periodic schedule, for example, data, audio, telephony, mice or other pointing devices, and other applications. The periodic schedule is traversed once the beginning at the start of each microframe.

The async schedule is organized as a round-robin loop that is traversed as many times as possible following the periodic schedule, but before the end of a microframe. The async schedule provides an asynchronous data transfer and is useful for such devices as hard drives, printers, and scanners.

Figure 4:
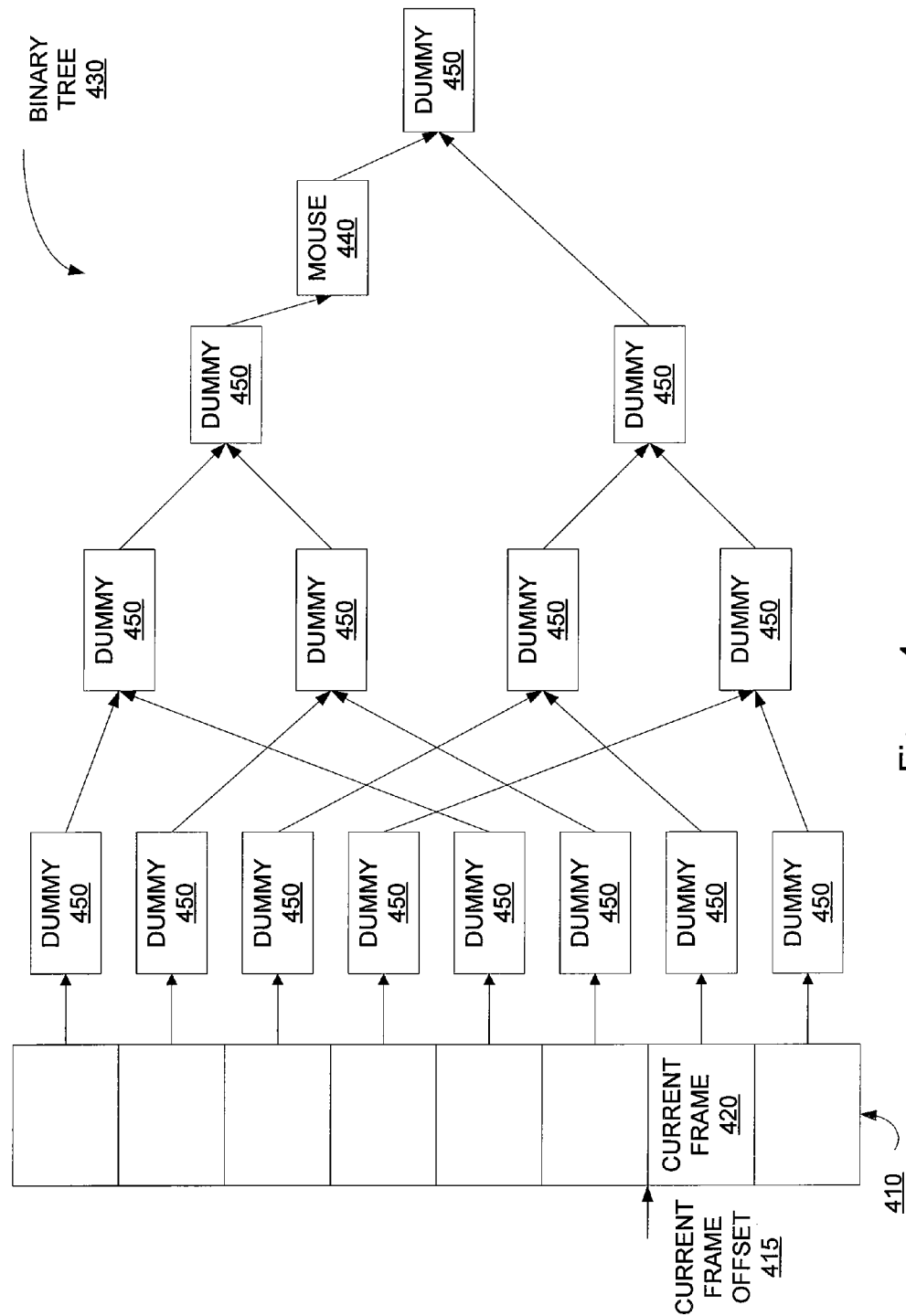
FIG. 4 is a symbolic representation of a periodic schedule that may be used by embodiments of the present invention.

FIG. 4 is a symbolic representation of a periodic schedule that may be used by embodiments of the present invention. Included are a periodic frame list 410, binary tree 430, one actual transfer descriptor 440 (for a mouse), and dummy transfer descriptors 450. More details regarding these transfer descriptors and their handling can be found in U.S. patent application Ser. No. 10/640,762, titled "Segregated Caching in Linked Lists for USB," filed Aug. 13, 2003, by Berendsen, which is incorporated by reference.

The periodic frame list 410 is a list of starting points. The current frame offset 420 indicates the leaf in the binary tree 430 where the current traversal will begin. At the start of each frame, the current frame offset 420 is incremented by one space. From the indicated leaf, the periodic schedule is traversed to the root. To prevent shuffling of pointers as devices or endpoints are added and removed, dummy descriptors 450 are placed at each node in the binary tree 430 and descriptors for which work is to be done are inserted between these dummy descriptors 450. In this specific example, there is work to be done at only one node 440; this work is for the mouse, and its descriptor 440 is inserted between two dummy descriptors 450. Using this tree structure, some applications may receive guaranteed bandwidth each microframe, every second microframe, every fourth microframe, and so on. In this example, the mouse will be queried for an update during one-half of all frames.

Figure 5:
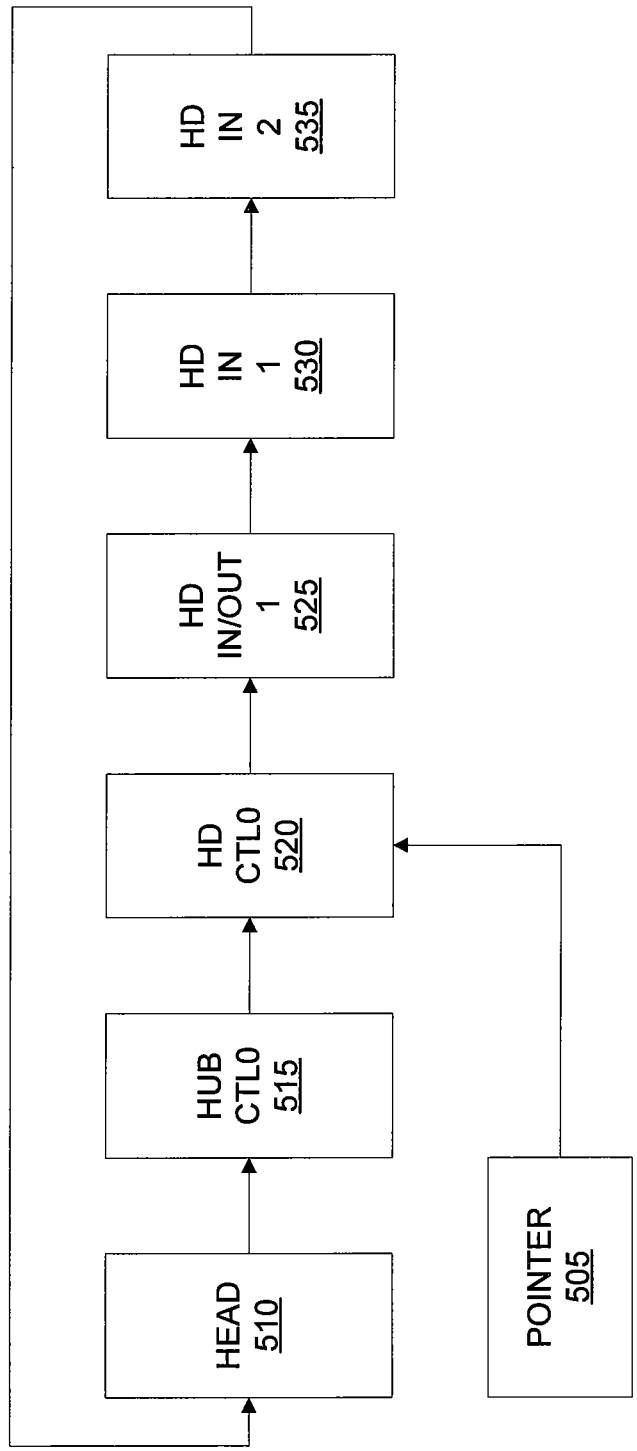
FIG. 5 is a symbolic representation of an asynchronous schedule that may be used by an embodiment of the present invention.

FIG. 5 is a symbolic representation of an async schedule that may be used by an embodiment of the present invention. Included are pointer 505, followed by transfer descriptors 510, 515, 520, 525, 530, and 535.

During each microframe, following the traversal of the periodic schedule, the async schedule is traversed as many times as possible until the end of the microframe. The async schedule is arranged in a round-robin fashion, wherein the traversal begins with the transfer descriptor following the transfer descriptor processed last in the previous microframe. For example, if transfer descriptor 515 was the last transfer descriptor processed in a microframe, during the next microframe, the async schedule is traversed beginning with transfer descriptor 520.

Again, devices, functions, or endpoints such as a mouse, operate as slave devices on a universal serial bus. As such, they do not initiate communications with a host controller, rather, the host controller pings or queries them on a regular basis dictated by the schedules discussed above. Each time the USB host controller is scheduled to request information from the device, it first reads information regarding that device from the system memory. Similarly, once it requests and receives information from the device, it may be necessary to write new information back to the system memory.

As an example, when a host controller is scheduled to request information from a mouse, it reads information from the system memory regarding the mouse. This information includes, in one example, a bus address for the mouse and protocol information used in accessing the mouse. A request for this information is sent to the central processing unit, which in turn reads it from a system memory and provides it to the universal serial bus host controller. The USB host controller uses this information to ask the mouse if it has been moved. Position information, if any, is then written back to the system memory via the same path. This data flow is shown in the following figures.

Figure 6A:
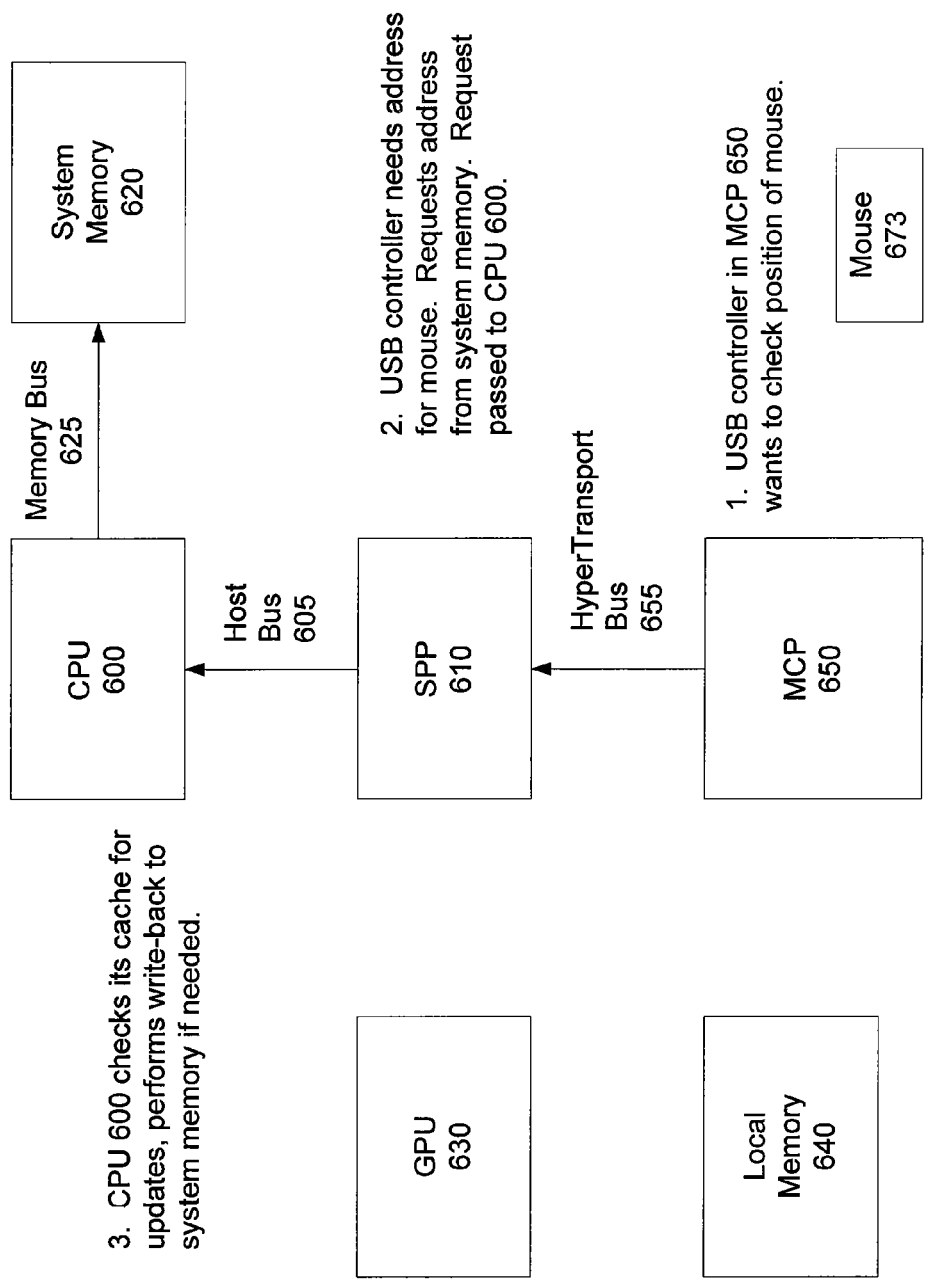
FIGS. 6A-C illustrate a flow of data in a computer system that is improved by an embodiment of the present invention.
Figure 6B:
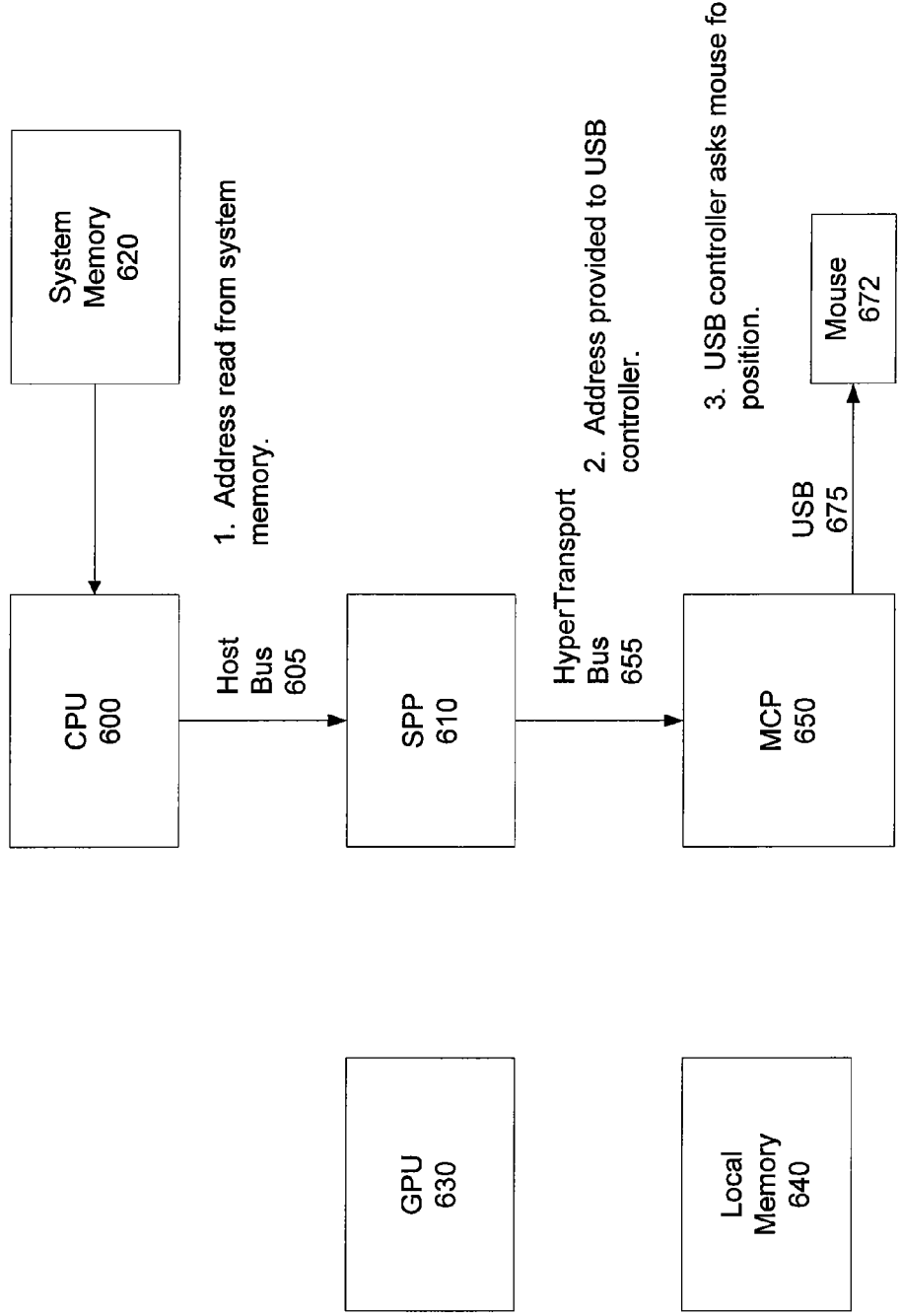
Figure 6C:
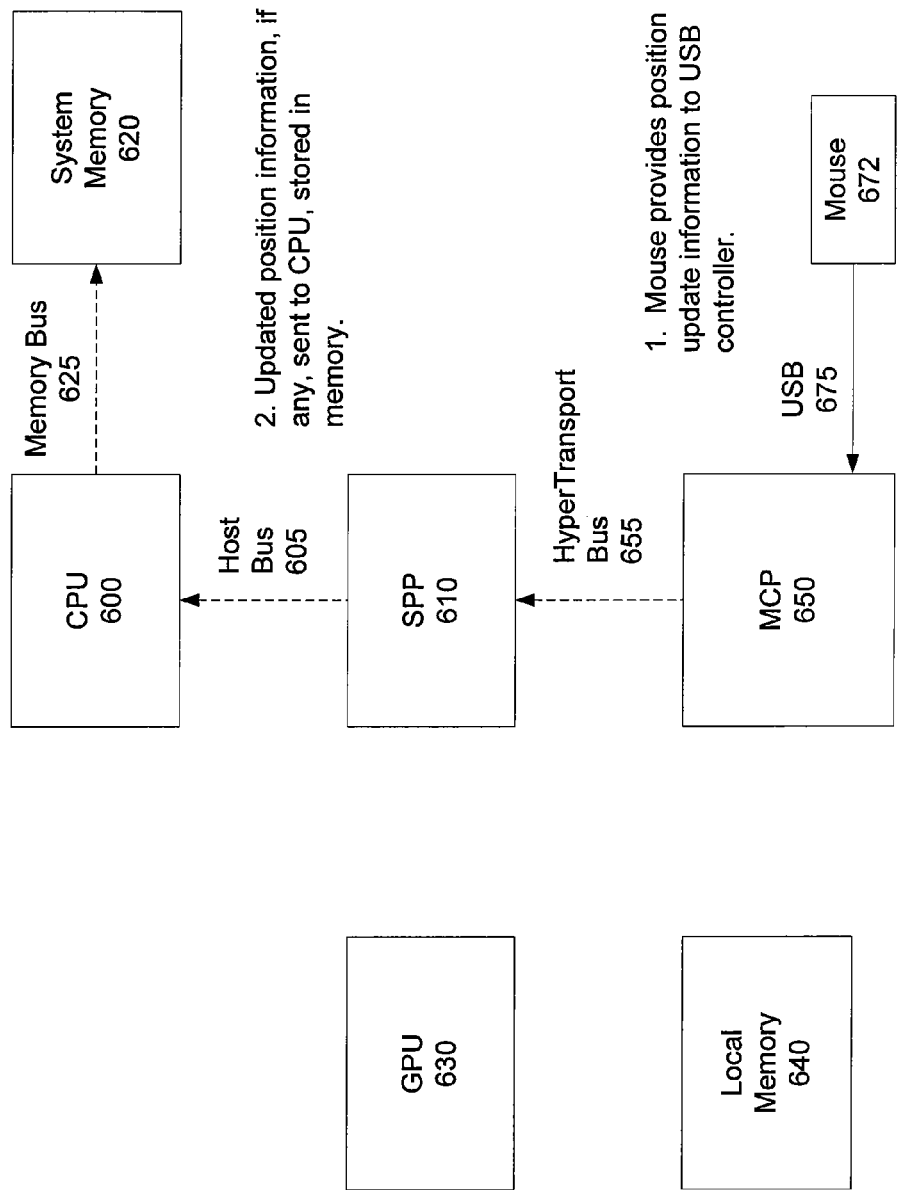

FIGS. 6A-C illustrate a flow of data in a computer system that is improved by an embodiment of the present invention. In FIG. 6A, a USB host controller in an MCP 650 is scheduled to request information from mouse 673 regarding changes in its position. Accordingly, the USB controller needs a bus address for the mouse, as well as other information regarding the mouse. This information is requested from the central processing unit 600. The request is passed to the CPU 600 via the system platform processor 610.

In various embodiment of the present invention, this address and other information are cached on the CPU 600. When this is the case, the CPU 600 checks its cache to see if the information has been updated and responds with the requested information. If this information is not cached, the CPU 600 reads the information from the system memory 620.

In FIG. 6B, the address is provided to the USB controller, again via the system platform processor 610. The USB controller can then ask the mouse 672 for an update in its position. If the mouse has not been moved, it may reply with an acknowledgment. This acknowledgment means that it has received the inquiry but has no information to return, that is, it has not been moved since the last inquiry.

In FIG. 6C, if there has been a change in the mouse position, this information is returned to the USB controller, which then provides it to the CPU 600. The CPU caches it and writes it to the system memory 620 as appropriate.

Again, each time the CPU is in a low-power or sleep mode and needs to write or read data to or from its cache or system memory, the CPU needs to leave the low-power or sleep mode and enter a higher power dissipation node. This is particularly undesirable in battery-powered devices, since entering this mode reduces battery life. This change in CPU power dissipation is illustrated in the following two figures.

FIG. 7A illustrates an increase in CPU power dissipation when various activities initiated by a USB host controller occur. The CPU power 710 is plotted as a function of time 720. In this example, a USB host controller is scheduled, among other tasks, to query a mouse regarding its position. The USB host controller requests address and other information from the CPU. Accordingly, the CPU reads the address and other information from memory or cache and initiates a write-back if needed. This information is then provided to USB controller. Accordingly, CPU power 710 increases, as shown by rising edge 732. The power dissipation stays high as pulse 730 while the CPU performs these tasks.

Once the CPU has completed this task, it may return to low-power state, as shown by falling edge 734. At a later time, the CPU may receive a position update for the mouse from the USB host controller. This may result in a separate increase in power 740. Alternately, the increases in power 730 and 740 may merge into one such increase. That is, the two pulses shown may merge into one. Also, as described above, there may be no new information to write to memory, and pulse 740 may not occur.

In various embodiments of the present invention, address and other information for the devices on a bus to be accessed during a frame is requested at the start of the frame. In other embodiments, information may be requested at other times, for example at the start of one or more microframes. An example illustrating changes in CPU power where information is requested from memory near the start of each frame is illustrated in FIG. 7B.

FIG. 7B illustrates changes in CPU power over a number of frames. In this example, a device is to be accessed each frame. Accordingly, address and other information for the device is requested from memory near the start of each frame 770. In this example, four frames are shown. Accordingly, four increases in CPU power 750 are shown.

Again, after address and other information is received from memory, the USB host controller can make inquiries of one or more devices on the USB bus according to the schedules as outlined above. A particular device may be queried every frame, or it may be queried less often than every frame. The following figure illustrates bus traffic, where a mouse is the only device on the bus, and it is queried every frame.

Figure 8:
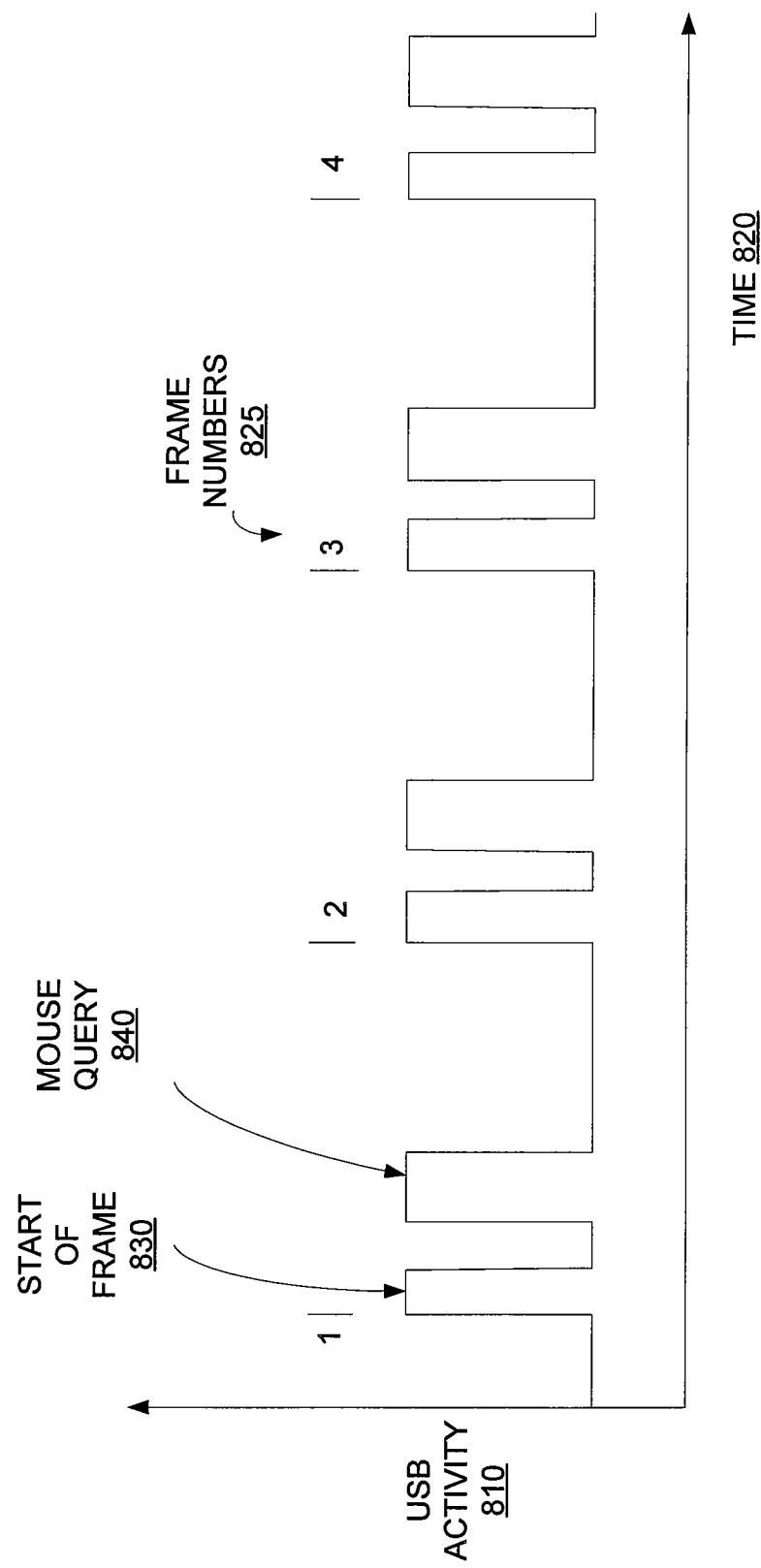
FIG. 8 illustrates USB traffic corresponding to FIG. 7B.

FIG. 8 illustrates USB traffic corresponding to FIG. 7B. Again, in this example, a lone mouse is the only device on the bus and information is requested from the mouse once each frame. A start of frame signal 830 is provided by the USB host controller at the start of each frame identified by numbers 825. A mouse query 840 follows. It should be noted the each query itself also consumes power, since each data transfer inevitably requires some power dissipation.

Under some conditions, a lower level of performance maybe be acceptable. This is particularly true when using a laptop or similar device that is battery-powered. Small trade-offs in performance that result in power savings can be very desirable to make. Accordingly, embodiments of the present invention do not traverse the periodic and async schedules during some frames. That is, information is not requested from any of the devices on the bus during some frames. This means that for these frames, address and other information does not need to be requested from the system memory. This eliminates some of the increases in CPU power 750. A flowchart illustrating a method of reducing power dissipation according to an embodiment of the present invention is shown in the following figure.

Figure 9:
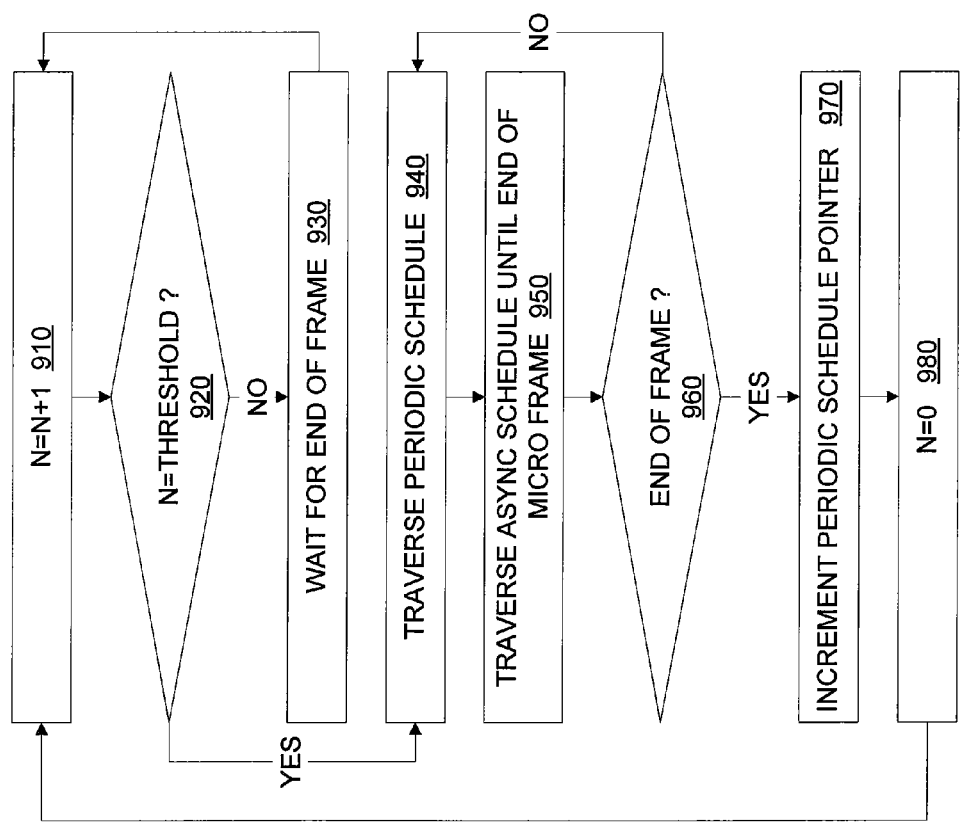
FIG. 9 illustrates a method of reducing power dissipation caused by data transfers initiated by a USB host controller according to an embodiment of the present invention.

FIG. 9 illustrates a method of reducing power dissipation caused by data transfers initiated by a USB host controller according to an embodiment of the present invention. This embodiment employs a counter that is incremented each frame. The counter may be implemented in software. Alternately, the counter may be implemented in hardware. For example, the counter may be implemented using a number of flip-flops or other appropriate circuits. In other embodiments, a timer, such as a general purpose hardware timer may be used to generate an interrupt when the CPU should enable the schedules. The frame counter may be a frame counter that is implemented in the USB controller or USB controller software for other purposes. Typically, a hardware counter in the USB controller is used. A hardware counter eliminates the need of the CPU to be involved in enabling and disabling the schedule. Also, shorter cycles of enabling and disabling the schedules while still saving power is possible using a hardware counter. This is particularly useful with devices such as a mouse, which requires reasonably short response times.

When the counter reaches a threshold level, one or more devices on the bus are queried according to the periodic and async schedules. That is, the periodic and async schedules are traversed. Until the counter reaches the threshold level however, the schedules are not traversed, and information is not requested from the devices on the bus. This eliminates the need for requests from memory, and allows the CPU to remain in a low-power or sleep state (if it is in such as state.)

Specifically, in act at 910, the counter is incremented. In act 920, it is determined whether the counter has reached its threshold. If not, when the end of the frame has been reached in act 930, the counter can be incremented again.

If the counter has reached its threshold in act 920, the periodic schedule is traversed in act 940. The async schedule is then traversed until the end of the current microframe in act 950. At the end of the microframe, it is determined whether the end of the frame has been reached in act 960. It has not, the periodic schedule and async schedules are traversed again in the following microframe.

If the end of the frame has been reached in act 960, the periodic schedule pointer is incremented in act 970, and the counter is reset in act 980.

In a specific embodiment of the present invention, a capabilities structure (CAPS) is used to identify a host controller interface as being capable of skipping frames as outlined above. When the host controller driver reads this capability structure, it learns that the host controller is capable of skipping frames. The number of frames to be skipped is set in this specific embodiment of the present invention using a memory mapped register in the PCI register space. Once the host controller driver determines that the host controller has the capability of skipping frames, the driver determines how many frames to skip by reading these registers and then programs the host controller interface accordingly.

In various embodiment of the present invention, the counter threshold may be set to various values. In a specific embodiment of the present invention, the periodic and async schedules are traversed during one frame in each of 32 frames. In other embodiments of the present invention, this ratio may be different. Also, this ratio may either be fixed or variable based on one or more criteria, such as user activity or battery level. In the example shown in the following figure, the periodic and async schedules are traversed one frame in each of two frames.

Figure 10:
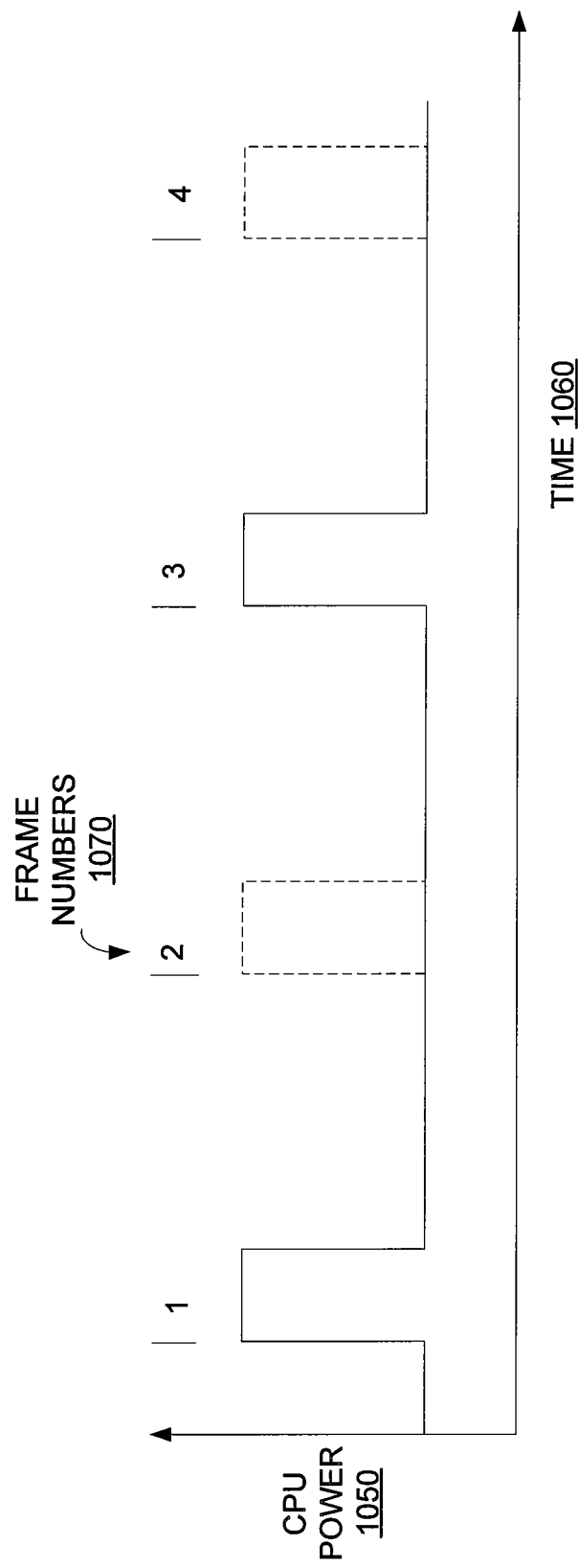
FIG. 10 illustrates a reduction in CPU power provided by an embodiment of the present invention.

FIG. 10 illustrates a reduction in CPU power provided by an embodiment of the present invention. In this example, as in FIG. 7B, CPU power 1050 increases near the beginning of each frame as address and other information is read from system memory. In this example however, power increases for frames two and four are eliminated since the periodic and async schedules are not traversed during these frames.

Implementing embodiments of the present invention saves power elsewhere in the system as well. For example, the memory itself may enter a low-power or self refresh mode. When data is written to or read from memory, the memory must first exit this low power state, resulting in a power increase. Also, the MCP, or portions of the MCP, may enter a low power state, only to be woken each time the host controller makes a memory request. Moreover, power dissipation results each time data is transferred from one device to another. Reducing the frequency with which a host controller requests information from devices on the bus, that is, the frequency with which the periodic and async schedules are traversed, may result in saving power in one or all of these devices.

Figure 11:
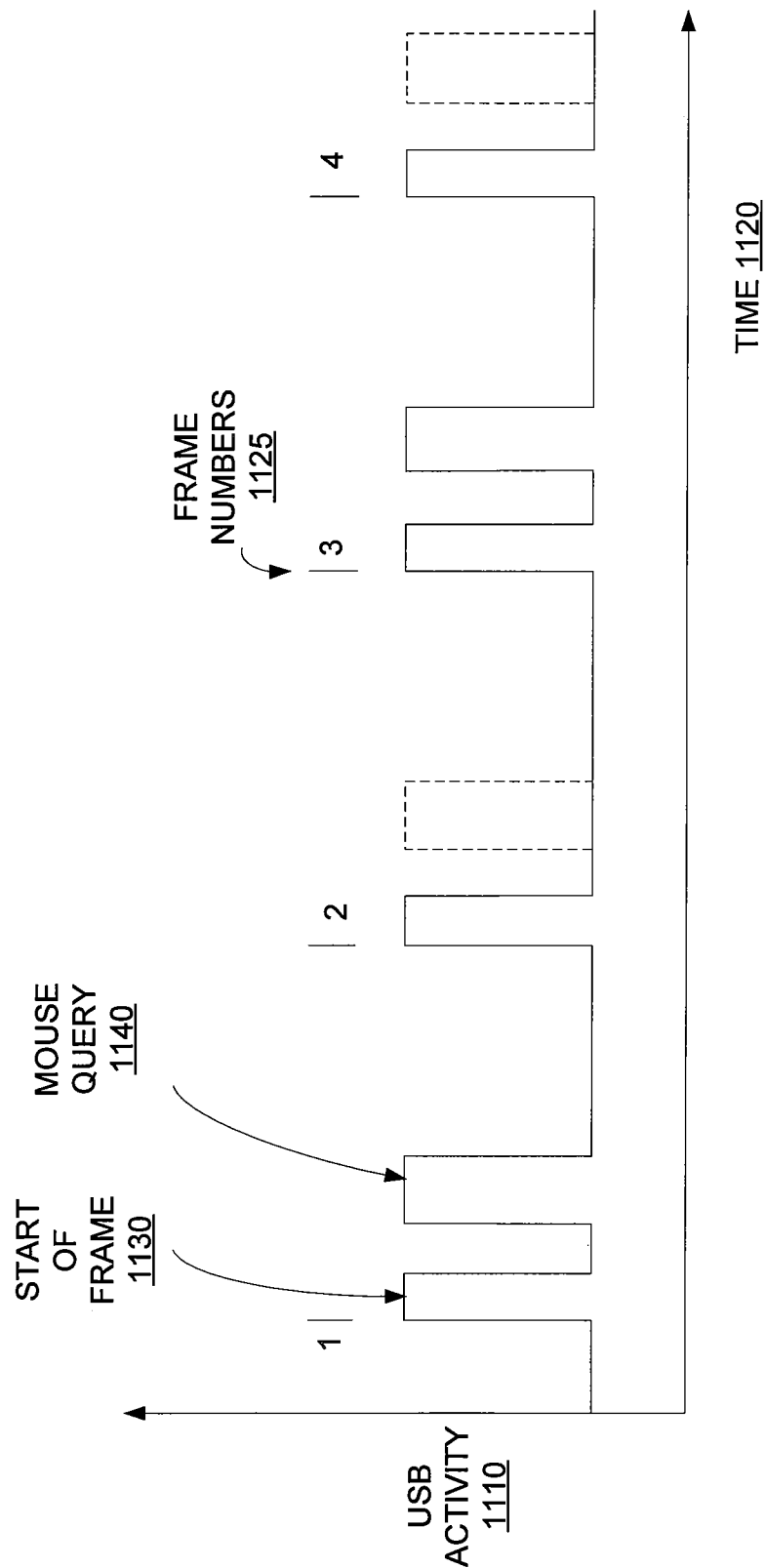
FIG. 11 illustrates changes in bus traffic according to an embodiment of the present invention.

FIG. 11 illustrates changes in bus traffic according to an embodiment of the present invention. In this figure, as with FIG. 8, a mouse is the sole resident on a bus, and the mouse would normally be queried once every frame. Again, a start of frame signal 1130 is provided once each frame, whether periodic and async schedules are traversed or not. During frames one and three, information is requested from the mouse. To do this, information was requested from memory, which may have caused the CPU to leave the low power state. During frames two and four, a mouse query does not occur.

Embodiments of the present invention are particularly useful in a situation where a user is operating a battery-powered laptop with a USB mouse connected. Such a user may find battery lifetime to be very important. The user may be inactive for periods of time, and as such, it is undesirable to the mouse to needlessly increase power dissipation. In such a situation, making inquiries of the mouse on a less frequent basis may result in a minor performance reduction while saving power.

In some situations, this reduction in performance may be mitigated. In the above example, position updates are requested from a mouse each frame. Often however, a mouse or other device is queried only every other frame, or every fourth frame, as shown by the periodic schedule in FIG. 4 above. Accordingly, some embodiments of the present invention reschedule one or more devices such that they are queried more often when the schedules are traversed. Specifically, they are rescheduled to locations further to the right in the periodic schedule. In this way, though the schedule is traversed less frequently, when it is, information is gathered from more devices, resulting in a moderation of the resulting performance losses.

In various embodiments of the present invention, different criteria may be used in determining whether to request information from devices on the bus, that is, whether to not traverse the periodic and async schedules during some frames, as well as in determining how many frames to wait before traversing the schedules. For example, a certain level of inactivity may be determined on the part of a user. If the user activity falls below this level, then during some frames, the schedules are not traversed, and data does not need to be read from system memory. This allows the CPU to remain in a lower power state for longer periods of time.

Also, in various embodiment of the present invention, the number of frames for which the schedules are not traversed may vary. That is, the counter threshold value in act 920 may change depending on various criteria such as user activity. For example, higher threshold values may result from longer periods of inactivity. Alternately, battery power levels may be monitored and used in determining whether or not to traverse the schedules, as well as in setting the counter threshold value. For example, as battery-powered decreases, devices on the bus may be queried progressively less often.

Various embodiments of the present invention may use different techniques to instruct the USB host controller to not schedule activity during some frames. Typically, USB host controller driver software operating on the CPU is used. In other embodiments of the present mention, other software or hardware solutions residing elsewhere, for example on the CPU or MCP may be used.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A method of controlling a universal serial bus comprising:
   during a first frame, querying at least one device on the universal serial bus according to a periodic schedule; then
   during N−1 frames, not querying at least one device on the universal serial bus according to the periodic schedule, though the device is scheduled to be queried; then
   during an Nth frame, querying at least one device on the universal serial bus according to the periodic schedule, wherein a value of N is progressively increased during a period of user inactivity.

2. The method of claim 1, further comprising:
   during the first and Nth frame, requesting information from the memory; and
   during the N−1 frames, not requesting information from the memory.

3. The method of claim 2, further comprising:
   during the first and Nth frame, at least partially traversing an asynchronous schedule.

4. The method of claim 2, further comprising:
   tracking frames using a hardware timer.

5. The method of claim 2, further comprising:
   tracking frames using a hardware counter.

6. The method of claim 2, wherein the information requested from the memory comprises:
   a bus address; and
   protocol information.

7. The method of claim 2, further comprising:
   at the start of each frame, providing a start of frame signal to the universal serial bus.

8. The method of claim 1, wherein the device on the universal serial bus is scheduled to be queried during at least one of the N−1 frames.

9. The method of claim 1, further comprising:
   rescheduling a device in the periodic schedule such that the device is accessed at a greater frequency.

10. The method of claim 1, wherein a value of N is progressively increased as a battery power level decreases.

11. The method of claim 1, wherein a value of N is determined by querying capability information stored in a register.

12. The method of claim 1, further comprising, commensurate with progressively increasing a value of N, rescheduling a device in the periodic schedule such that the device is accessed at a greater frequency.

13. An integrated circuit comprising:
   a first interface configured to:
      during a first frame, querying at least one device on the universal serial bus according to a periodic schedule; then during N-1 frames, not querying at least one device on the universal serial bus according to the periodic schedule, though the device is scheduled to be queried; then during an Nth frame, querying at least one device on the universal serial bus according to the periodic schedule, wherein a value of N is progressively increased as a battery power level decreases.

14. The integrated circuit of claim 13, further comprising:
during the first and Nth frame, requesting information from the memory; and
during the N-1 frames, not requesting information from the memory.

15. The integrated circuit of claim 14, further comprising:
during the first and Nth frame, at least partially traversing an asynchronous schedule.

16. The integrated circuit of claim 14, further comprising:
tracking frames using a hardware timer.

17. The integrated circuit of claim 14, further comprising:
tracking frames using a hardware counter.

18. The integrated circuit of claim 14, wherein the information requested from the memory comprises:
a bus address; and
protocol information.

19. The integrated circuit of claim 14, further comprising:
at the start of each frame, providing a start of frame signal to the universal serial bus.

20. The integrated circuit of claim 13, wherein the device on the universal serial bus is scheduled to be queried during at least one of the N-1 frames.

21. The integrated circuit of claim 13, wherein a value of N is progressively increased during a period of user inactivity.

22. The integrated circuit of claim 13, further comprising:
rescheduling a device in the periodic schedule such that the device is accessed at a greater frequency.

23. The integrated circuit of claim 13, wherein a value of N is determined by querying capability information stored in a register.

24. The integrated circuit of claim 13, further comprising, commensurate with progressively increasing a value of N, rescheduling a device in the periodic schedule such that the device is accessed at a greater frequency.

25. A method of controlling a universal serial bus comprising:
during a first frame, traversing a periodic schedule; then
during N-1 frames, not traversing the periodic schedule, though a device on the universal serial bus is scheduled to be accessed; and then
during an Nth frame, traversing the periodic schedule,
wherein a value of N is progressively increased during a period of user inactivity.

26. A method of controlling a universal serial bus comprising:
during a first frame, querying at least one device on the universal serial bus according to a periodic schedule; then
during N-1 frames, not querying at least one device on the universal serial bus according to the periodic schedule, though the device is scheduled to be queried; then
during an Nth frame, querying at least one device on the universal serial bus according to the periodic schedule; and
commensurate with progressively increasing a value of N, rescheduling a device in the periodic schedule such that the device is accessed at a greater frequency.

27. The method of claim 26, further comprising:
during the first and Nth frame, requesting information from the memory; and
during the N-1 frames, not requesting information from the memory.

28. The method of claim 27, further comprising:
during the first and Nth frame, at least partially traversing an asynchronous schedule.

29. The method of claim 27, further comprising:
tracking frames using a hardware timer.

30. The method of claim 27, further comprising:
tracking frames using a hardware counter.

31. The method of claim 27, wherein the information requested from the memory comprises:
a bus address; and
protocol information.

32. The method of claim 27, further comprising:
at the start of each frame, providing a start of frame signal to the universal serial bus.

33. The method of claim 26, wherein the device on the universal serial bus is scheduled to be queried during at least one of the N-1 frames.

34. The method of claim 26, wherein a value of N is progressively increased during a period of user inactivity.

35. The method of claim 26, further comprising:
rescheduling a device in the periodic schedule such that the device is accessed at a greater frequency.

36. The method of claim 26, wherein a value of N is progressively increased as a battery power level decreases.

37. The method of claim 26, wherein a value of N is determined by querying capability information stored in a register.

* * * * *